(12) United States Patent
Sudoh et al.

(10) Patent No.: US 11,150,259 B2
(45) Date of Patent: Oct. 19, 2021

(54) SYSTEM AND METHOD FOR DISPLAY CONTROL OF GAUGE GRAPHIC

(71) Applicant: Honda Motor Co., Ltd., Tokyo (JP)

(72) Inventors: Takashi Sudoh, Torrance, CA (US); Andrew R. Hoover, West Liberty, OH (US); David Justin Brewer, Columbus, OH (US); Cody D. Grebe, Marysville, OH (US); Jerome L. Piche, Camarillo, CA (US)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 16/714,328

(22) Filed: Dec. 13, 2019

(65) Prior Publication Data

US 2021/0181227 A1 Jun. 17, 2021

(51) Int. Cl.
| | |
|---|---|
| *B60Q 1/00* | (2006.01) |
| *G01P 1/11* | (2006.01) |
| *G01P 1/10* | (2006.01) |
| *B60K 31/18* | (2006.01) |
| *B60K 37/02* | (2006.01) |
| *B60K 35/00* | (2006.01) |
| *B60K 37/06* | (2006.01) |

(52) U.S. Cl.
CPC .............. *G01P 1/11* (2013.01); *B60K 31/185* (2013.01); *B60K 35/00* (2013.01); *B60K 37/02* (2013.01); *B60K 37/06* (2013.01); *G01P 1/103* (2013.01); *B60K 2370/193* (2019.05); *B60K 2370/698* (2019.05)

(58) Field of Classification Search
CPC .......... G01P 1/11; G01P 1/103; B60K 31/185; B60K 35/00; B60K 37/02; B60K 37/06; B60K 2370/193; B60K 2370/698

USPC ......................................................... 340/441
See application file for complete search history.

(56) References Cited

U.S. PATENT DOCUMENTS

| | | |
|---|---|---|
| 4,872,093 A | 10/1989 | Shimizu |
| 7,441,189 B2 | 10/2008 | Michaels |
| 8,339,400 B2 | 12/2012 | Katoh et al. |
| 8,384,619 B2 | 2/2013 | Shirakura et al. |
| 8,570,308 B2 | 10/2013 | Ogasawara |
| 8,638,206 B2 | 1/2014 | Boutin |
| 8,830,260 B2 | 9/2014 | Ogasawara et al. |

(Continued)

FOREIGN PATENT DOCUMENTS

JP 2004045131 A 2/2004

*Primary Examiner* — Zhen Y Wu
(74) *Attorney, Agent, or Firm* — American Honda Motor Co., Inc.; Suzanne B. Gagnon

(57) ABSTRACT

A display system and a method for display control of a gauge graphic is provided. The display system controls the display device to display the gauge graphic. The gauge graphic includes a scale and a needle movable on the scale. The scale includes a first region and a second region. The display system detects a first movement of the needle beyond a first threshold marking on the scale and towards an end of the first region and controls the display device to gradually unmask a first gradation pattern in the second region based on the detected first movement. The display system further detects a second movement of the needle over the second region and controls the display device to change the unmasked first gradation pattern so that the unmasked first gradation pattern flashes with a defined frequency in the second region based on the detected second movement.

18 Claims, 6 Drawing Sheets

(56) References Cited

U.S. PATENT DOCUMENTS

| | | | |
|---|---|---|---|
| 9,409,481 B2* | 8/2016 | Choi | G01D 7/002 |
| 9,463,693 B2* | 10/2016 | Oishi | B60K 37/02 |
| 9,466,264 B2* | 10/2016 | Oishi | G01D 7/06 |
| 9,956,908 B2* | 5/2018 | Hisada | B60K 37/02 |
| 10,252,616 B2* | 4/2019 | Kobayashi | G09G 5/02 |
| 10,984,603 B2* | 4/2021 | Fateh | G09G 5/00 |
| 2005/0280521 A1* | 12/2005 | Mizumaki | B60K 35/00 |
| | | | 340/438 |
| 2007/0008186 A1 | 1/2007 | Michaels et al. | |
| 2008/0018488 A1* | 1/2008 | Struck | G01D 11/28 |
| | | | 340/815.86 |
| 2013/0174773 A1* | 7/2013 | Nagara | B60K 37/02 |
| | | | 116/201 |
| 2014/0182508 A1* | 7/2014 | Oishi | G01P 1/11 |
| | | | 116/62.3 |
| 2014/0225721 A1* | 8/2014 | Simon | B60K 35/00 |
| | | | 340/435 |
| 2015/0109756 A1* | 4/2015 | Choi | G01D 7/005 |
| | | | 362/23.01 |
| 2016/0096432 A1* | 4/2016 | Kobayashi | G01D 7/02 |
| | | | 340/461 |
| 2016/0311370 A1* | 10/2016 | Oyanagi | G01D 13/265 |
| 2018/0182241 A1* | 6/2018 | Ahn | G08G 1/0967 |
| 2018/0215266 A1* | 8/2018 | Shoji | G06T 5/003 |
| 2019/0210519 A1* | 7/2019 | Kim | B60K 35/00 |
| 2019/0248240 A1* | 8/2019 | Fujita | B60K 35/00 |
| 2020/0391593 A1* | 12/2020 | Lee | G09G 5/024 |

\* cited by examiner

SYSTEM AND METHOD FOR DISPLAY CONTROL OF GAUGE GRAPHIC

BACKGROUND

In-vehicle displays, especially, multi-information displays (MIDs), include various UI elements for vehicle parameters, such as engine rotation or engine speed. On many such in-vehicle displays, information related to such vehicle parameters may be presented in a less fluid and less appealing manner to a driver, especially, at times, when such information needs to be updated continuously with variations in values of the vehicle parameters. This may affect visual ergonomics of the information and the driver may, at times, find the information to be less engaging for an emotion level that the driver might experience while driving.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a display system for display control of gauge graphic is provided. The display system may include a display device and control circuitry. The control circuitry may be coupled with the display device and may be configured to control the display device to display a gauge graphic. The gauge graphic may include a scale for a vehicle parameter and a needle movable on the scale. The scale may include a first region and a second region which may extend from the first region. The control circuitry may be further configured to detect a first movement of the needle beyond a first threshold marking on the scale. The first movement of the needle may be towards an end of the first region adjoining the second region. The control circuitry may be further configured to control the display device to gradually unmask a first gradation pattern in the second region. The gradual unmasking of the first gradation pattern may be based on the detected first movement of the needle. The control circuitry may be further configured to detect a second movement of the needle over the second region and control the display device to change the unmasked first gradation pattern.

According to another embodiment of the disclosure, a method for display control of gauge graphic is provided. The method may include controlling a display device to display a gauge graphic. The gauge graphic may include a scale for a vehicle parameter and a needle movable on the scale. The scale may include a first region and a second region which may extend from the first region. The method may further include detecting a first movement of the needle beyond a first threshold marking on the scale. The first movement of the needle may be towards an end of the first region adjoining the second region. The method may further include controlling the display device to gradually unmask a first gradation pattern in the second region. The gradual unmasking of the first gradation pattern may be based on the detected first movement of the needle. The method may further include detecting a second movement of the needle over the second region and controlling the display device to change the unmasked first gradation pattern.

According to another embodiment of the disclosure, a non-transitory computer-readable medium is provided. The non-transitory computer-readable medium may have stored thereon computer implemented instructions that, when executed by a display system, causes the display system to execute operations. The operations may include controlling a display device to display a gauge graphic. The gauge graphic may include a scale for a vehicle parameter and a needle movable on the scale. The scale may include a first region and a second region which may extend from the first region. The operations may further include detecting a first movement of the needle beyond a first threshold marking on the scale. The first movement of the needle may be towards an end of the first region adjoining the second region. The operations may further include controlling the display device to gradually unmask a first gradation pattern in the second region. The gradual unmasking of the first gradation pattern may be based on the detected first movement of the needle. The operations may further include detecting a second movement of the needle over the second region and controlling the display device to change the unmasked first gradation pattern so that the unmasked first gradation pattern flashes with a defined frequency in the second region based on the detected second movement of the needle.

Figure 1:
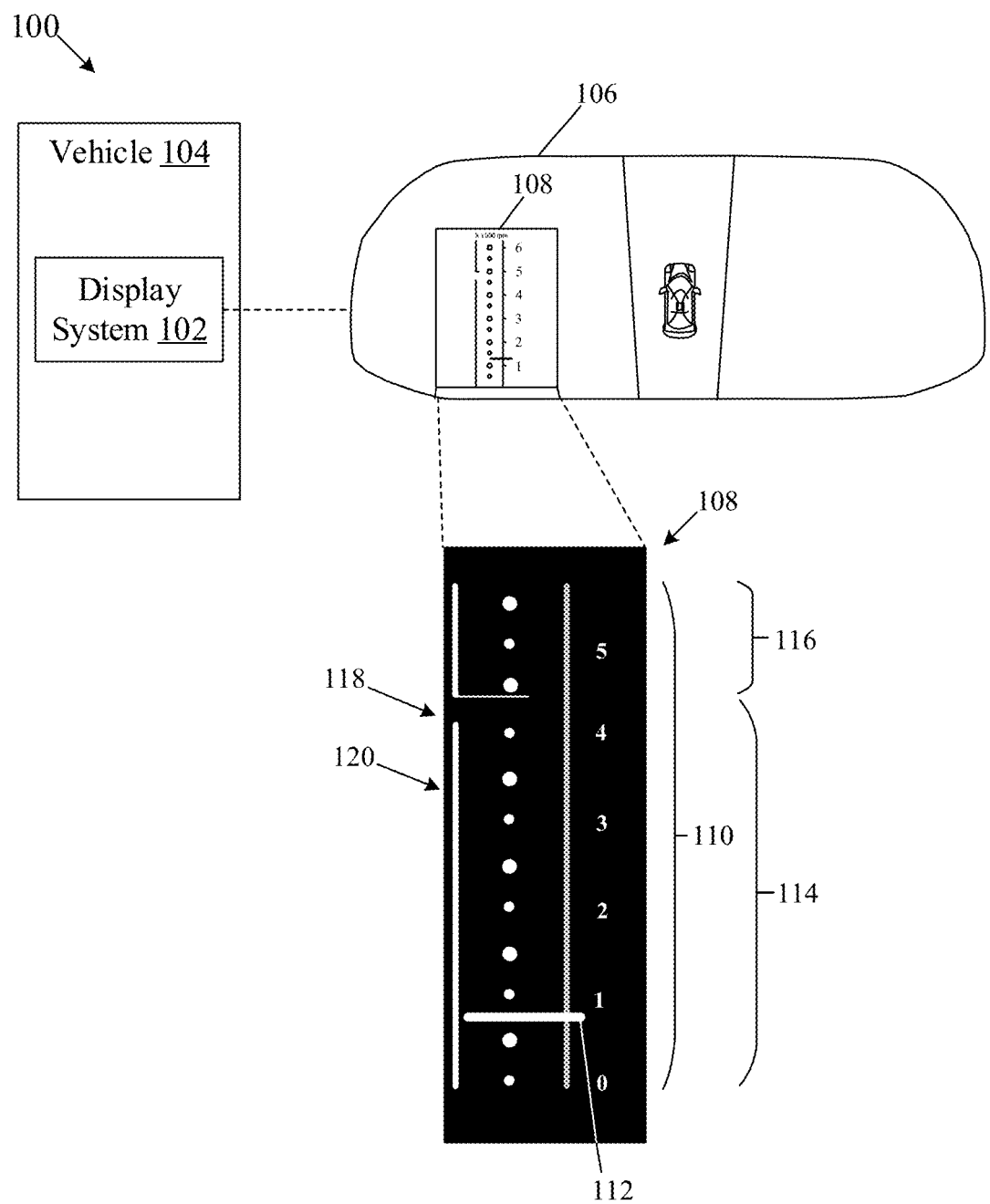
FIG. 1 is a diagram of an exemplary display system for display control of gauge graphic, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed display system of a vehicle for displaying a gauge graphic, for example, an engine rotation meter. Exemplary aspects of the disclosure may provide a display system that includes a display device to display a gauge graphic. The disclosed display system allows a user to experience a fluid user interface that matches a user's emotional level to the way information is presented via the gauge graphic. For example, as the vehicle throttles at a higher speed, the gauge graphic may use time-varying gradation patterns to highlight changes in engine rotation-per-minute (RPM). The gauge graphic may also incorporate a gradation pattern that, when active, uses a flashing effect to provide a visual cue to the driver or other occupants of the vehicle. Such a visual cue may be provided to, for example, match an emotion level of the driver or other occupants. Also, in some instances, the visual cue may alert or remind the driver or other occupants that the vehicle parameter has crossed a set limit for the vehicle parameter and may also help the driver to take suitable actions or preemptive measures to prevent any damage to the vehicle. It may, therefore, enhance the visual ergonomics of the information presented via the gauge graphic.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a diagram of an exemplary display system for display control of gauge graphic, in accordance with an embodiment of the disclosure. With reference to FIG. 1, there is shown a diagram 100 of a display system 102 of a vehicle 104. The display system 102 may include a display device 106. There is shown a gauge graphic 108 on the display device 106, for example.

The display system 102 may include suitable logic, circuitry, interfaces, and/or code that may be configured to control the display device 106 to display the gauge graphic 108. The gauge graphic 108 may include a scale 110 for a vehicle parameter and a needle 112 configured to be movable on the scale 110. The scale 110 may include two separate regions, for example, a first region 114 and a second region 116 that extends from the first region 114. The vehicle parameter may be any suitable parameter which may be relevant for the driver of the vehicle 104 and may be one of, for example, speed-related parameters, engine rotation (i.e., a digital tachometer), Advanced Driver-Assistance System (ADAS) related parameters, or fuel-related parameters. Examples of the display system 102 may include, but are not limited to, an in-vehicle infotainment system, a navigation system, an internet-enabled communication system, and other Heads-Up-Display (HUD) or non-HUD information display systems. In at least one embodiment, the display system 102 may include specialized electronic circuitry, for example, an Electronic Control-Unit (ECU) to acquire information related to various vehicle parameters and/or to control functions, such as, but not limited to, engine operations, communication operations, and data acquisition.

The vehicle 104 may be a non-autonomous vehicle, a semi-autonomous vehicle, or a fully autonomous vehicle, for example, as defined by National Highway Traffic Safety Administration (NHTSA). Examples of the vehicle 104 may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources.

The display device 106 may include suitable logic, circuitry, interfaces, and/or code that may be configured to display the gauge graphic 108. The gauge graphic 108 may depict, for example, a tachometer for an engine rotations-per-minute (RPM) or a speed gauge for a vehicle speed. The display device 106 may be, for example, a multi-information display (MID) panel, a digital instrument cluster, an automotive HUD, or a consumer-electronic (CE) device. Additionally, in certain instances, the display device 106 may include a touch screen, which may enable a user to provide a user input via the display device 106. The display device 106 may be realized through several known technologies such as, but not limited to, at least one of a Liquid Crystal Display (LCD) display, a Light Emitting Diode (LED) display, a plasma display, or an Organic LED (OLED) display technology, or other display devices. In at least one embodiment, the display device 106 may refer to a display screen of a head mounted device (HMD), a smart-glass device, a see-through display, a projection-based display, an electro-chromic display, or a transparent display.

In operation, the display system 102 may be configured to control the display device 106 to display the gauge graphic 108. The gauge graphic 108 may depict, for example, a digital tachometer for an engine RPM or a speed gauge for the vehicle 104. The gauge graphic 108 may include the scale 110 which may be, for example, a vertical scale that may include a plurality of scale markings along the length of the vertical scale. The color of the plurality of scale markings may be different from a background color (e.g., black) of the vertical scale. The scale 110 may be divided into the first region 114 and the second region 116, which may extend from a marking 118 on the scale 110. The gauge graphic 108 may also include the needle 112 and a plurality of scale values (e.g., 1, 2, 3 . . . 10 (×1000 RPM)) along the length of the vertical scale. The plurality of scale values may correspond to a range of values of the vehicle parameter and each scale value may be displayed by default by a first color which may be different from the background color of the vertical scale.

The display system 102 may receive sensor data associated with the vehicle parameter. Based on the received sensor data, the display system 102 may determine an idle state of the needle 112. For example, the needle 112 may be determined to be in the idle state if the received sensor data for the engine RPM is 0 RPM. The display system 102 may control the display device 106 to display the needle 112 on an initial marking (e.g., 0) on the scale 110 based on the determination of the idle state of the needle 112.

At a time instant, based on the received sensor data, the display system 102 may control the display device 106 to mask a first gradation pattern in the second region 116. This may be based on a determination that the needle is below a first threshold marking 120 on the scale. At another time instant, the display system 102 may detect a first movement of the needle 112 beyond the first threshold marking 120 on the scale 110 and towards an end (i.e., the marking 118) of the first region 114 adjoining the second region 116. The first movement of the needle 112 may be detected based on the received sensor data associated with the vehicle parameter. The display system 102 may further control the display device 106 to gradually unmask the masked first gradation pattern in the second region 116 based on the detected first movement of the needle 112. For example, to gradually unmask the masked first gradation pattern, the transparency level of the masked first gradation pattern may be gradually changed.

Additionally, or alternatively, the display system 102 may control the display device 106 to display a second gradation pattern as a trailing pattern adjoining the needle 112 based on the detected first movement. As an example, both the first gradation pattern and the second gradation pattern may be linear gradients. In an exemplary embodiment, the first gradation pattern may start from the top of the second region 116 with a color (e.g., red) which may gradually diminish at the bottom of the second region 116. In other embodiments, the first gradation pattern may start from the bottom of the second region 116 with the color which may gradually diminish at the top of the second region 116. In some embodiments, the second gradient pattern may start from the needle 112 as a colored trailing pattern (e.g., white-colored trailing pattern) which may gradually diminish along the length of the colored trailing pattern.

At another time instant, the display system 102 may detect a second movement of the needle 112 over the second region 116. The second movement of the needle 112 over the second region 116 may be also detected based on the received sensor data. In some embodiments, the display system 102 may control the display device 106 to change the unmasked first graduation pattern. In one embodiment, the display system 102 may control the display device 106 to change the unmasked first graduation pattern from a first color (e.g., grey) to a second color (e.g., red). In another embodiment, the display system 102 may control the display device 106 to gradually change the unmasked first gradation pattern so that the unmasked first gradation pattern flashes (e.g., sinusoidally) with a defined frequency in the second region 116. By way of example, in order to produce a flashing effect of the first gradation pattern once the needle 112 crosses into the second region 116, the display system 102 may control the display device 106 to progressively alternate a transparency level of the unmasked first gradation pattern between a minimum transparency level (e.g., 0%) and a maximum transparency level (e.g., 100%), so that the unmasked first gradation pattern flashes with the defined frequency. While the first gradation pattern flashes, the display system 102 may control the display device 106 to hide the second gradation pattern adjoining the needle 112. The flashing effect of the first gradation pattern may provide a visual cue to the driver or other occupants of the vehicle 104. Such a visual cue may be provided to, for example, match an emotion level of the driver or other occupants. Also, in some instances, the visual cue may alert or remind the driver or other occupants that the vehicle parameter has crossed a set limit for the vehicle parameter and may also help the driver to take suitable actions or preemptive measures to prevent any damage to the vehicle.

Figure 2:
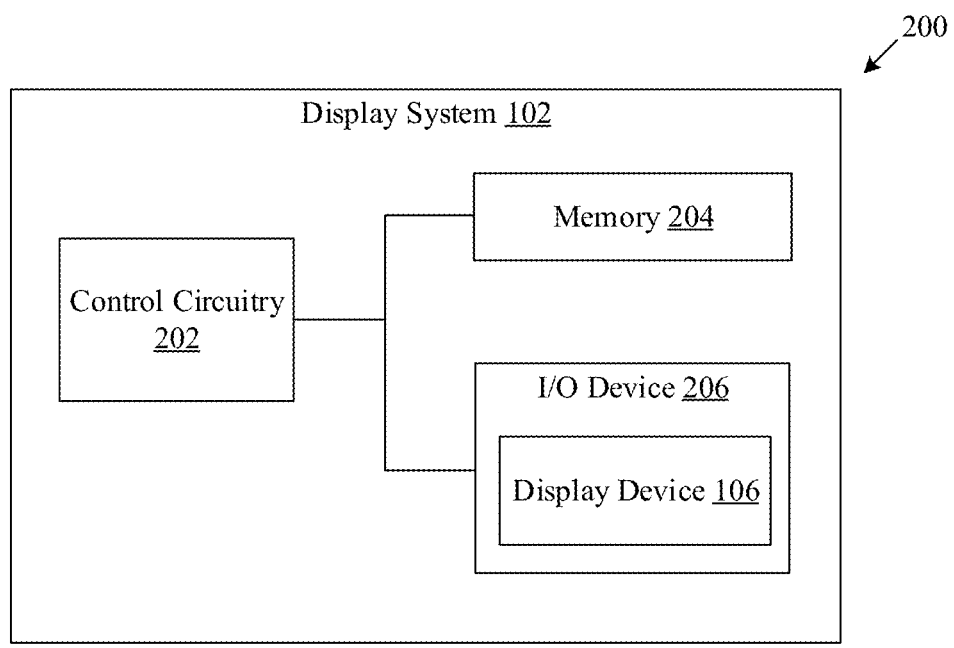
FIG. 2 is a block diagram that illustrates an exemplary display system for display control of gauge graphic, in accordance with an embodiment of the disclosure.

FIG. 2 is a block diagram that illustrates an exemplary display system for display control of gauge graphic, in accordance with an embodiment of the disclosure. FIG. 2 is explained in conjunction with elements from FIG. 1. With reference to FIG. 2, there is shown a block diagram 200 of the display system 102. The display system 102 may include control circuitry 202, a memory 204, and an I/O device 206. The control circuitry 202 may be connected to the memory 204 and the I/O device 206 through wired or wireless connections. Although in FIG. 2, it is shown that the display system 102 includes the control circuitry 202, the memory 204, and the I/O device 206; however, the disclosure may not be so limiting and the display system 102 may include less or more components to perform the same or other functions of the display system 102. Details of the other functions have been omitted from the disclosure for the sake of brevity.

The control circuitry 202 may include suitable logic, circuitry, interfaces, and/or code that may be configured to execute a set of operations related to display of the gauge graphic 108 and associated animation/transition effects on the display device 106. The control circuitry 202 may include any suitable special-purpose or general-purpose computer, computing entity, or processing device including various computer hardware or software modules and may be configured to execute instructions stored on any applicable computer-readable storage media. For example, the control circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The control circuitry 202 may include any number of processors configured to, individually or collectively, perform or direct performance of any number of operations of the display system 102, as described in the present disclosure. Examples of the control circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the control circuitry 202. The memory 204 may also store display information associated with the gauge graphic 108 and the sensor data associated with the vehicle parameter. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to may receive user inputs and generate outputs in response to the received user inputs. The I/O device 206 may include one or more input and output devices that may communicate with different components of the display system 102 and the vehicle 104, via an in-vehicle communication network. Examples of the I/O device 206 may include, but are not limited to, the display device 106, a touch screen, a digital dial/knob, a touch buttons, a microphone, a gesture controller, and/or an image sensor.

The functions or operations executed by the display system 102, as described in FIG. 1, may be performed by the control circuitry 202. Operations executed by the control circuitry 202 are described in detail, for example, in the FIGS. 3, 4, 5A, and 5B.

Figure 3:
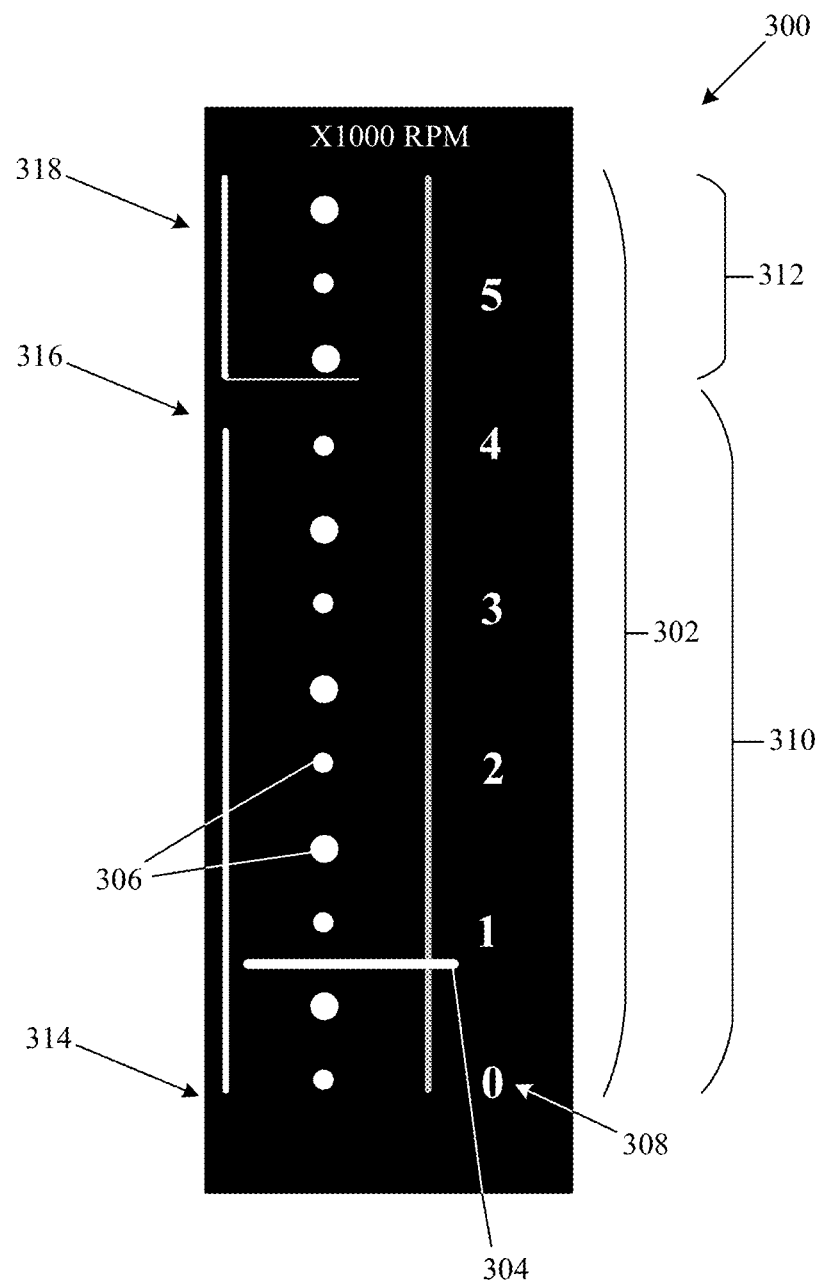
FIG. 3 is a diagram that illustrates an exemplary gauge graphic, in accordance with an embodiment of the disclosure.

FIG. 3 is a diagram that illustrates an exemplary gauge graphic, in accordance with an embodiment of the disclosure. FIG. 3 is explained in conjunction with elements from FIG. 1 and FIG. 2. With reference to FIG. 3, there is shown a gauge graphic 300 to depict the engine RPM, for example. The gauge graphic 300 includes a scale 302 and a needle 304 configured to be movable on the scale 302. The scale 302 is shown to be a vertical scale and includes a plurality of scale markings 306 along the length of the vertical scale. The plurality of scale markings 306 may have a different color from a background color of the scale 302. As shown, for example, the color of the plurality of scale markings 306 may be white, while the background color of the scale 302 may be black. The control circuitry 202 may be configured to display a plurality of scale values 308 along the length of the scale 302. The plurality of scale values 308 may correspond to a range of values of the engine RPM as the vehicle parameter. Each scale value of the plurality of scale values 308 may be displayed by a first color, for example, a grey color or the color of the plurality of scale markings 306, by default.

The scale 302 may be divided into a first region 310 and a second region 312. The first region 310 may extend from an initial scale marking 314 and up to a marking 316. Similarly, the second region 312 may extend from the marking 316 and up to a final scale marking 318.

Figure 4:
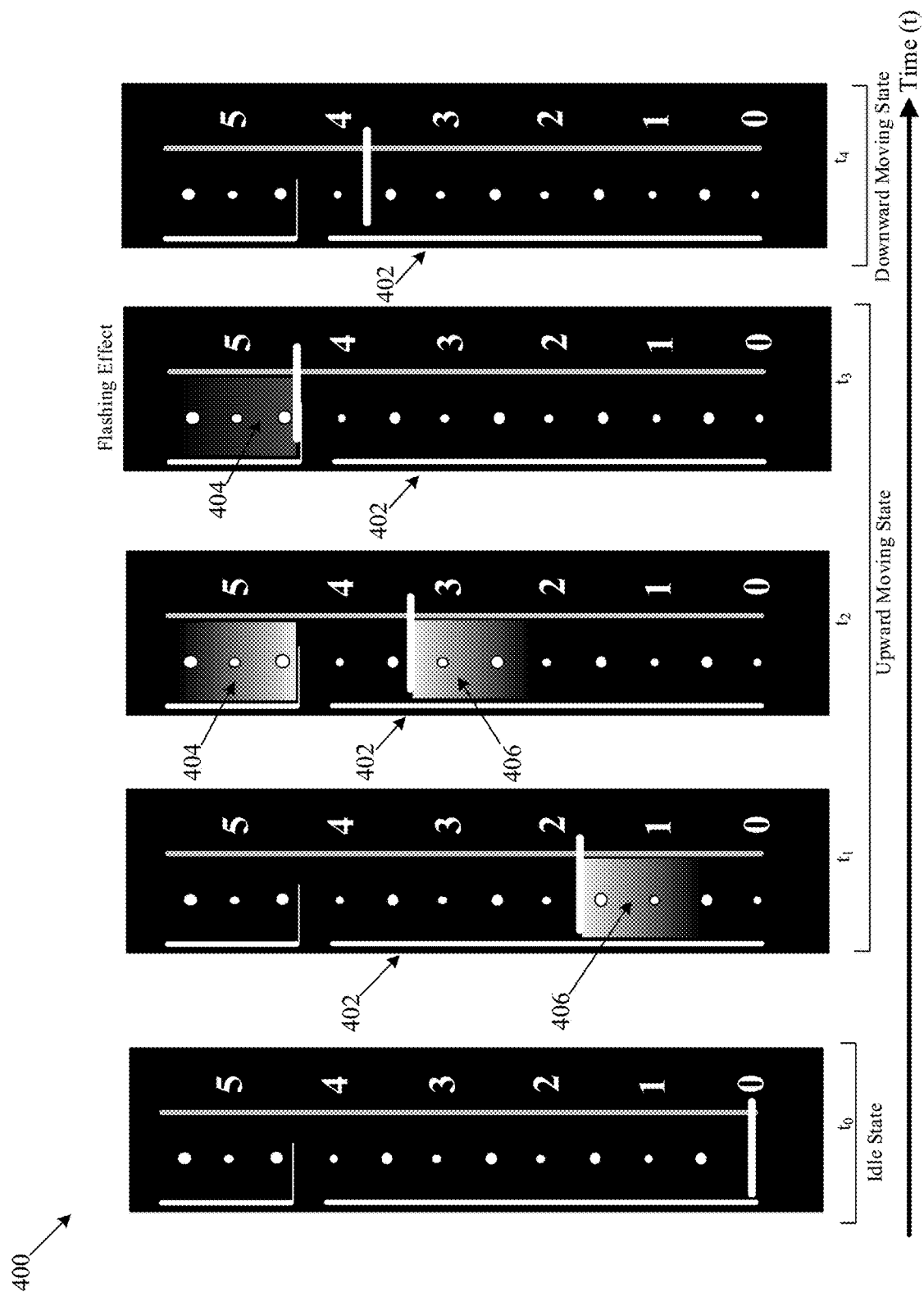
FIG. 4 is a diagram that illustrates an exemplary sequence in which the exemplary gauge graphic of FIG. 3 is displayed, in accordance with an embodiment of the disclosure.

FIG. 4 is a diagram that illustrates an exemplary sequence in which the exemplary gauge graphic of FIG. 3 is displayed, in accordance with an embodiment of the disclosure. FIG. 4 is explained in conjunction with elements from FIG. 1, FIG. 2, and FIG. 3. With reference to FIG. 4, there is shown an exemplary sequence 400 in the form of a timeline (i.e. from $t_0$ to $t_4$). In the exemplary sequence 400, appearance of the gauge graphic 300 is shown for different states of the needle 304, with different values of the vehicle parameter (e.g., the engine RPM). The control circuitry 202 may be configured to receive sensor data for the vehicle parameter as timeseries data at all time instances $t_0$, $t_1$, $t_2$, $t_3$, and $t_4$. The received sensor data may include, for example, a timeseries of readings of a camshaft sensor or a tachometer in the vehicle 104.

At $t_0$, the gauge graphic 300 may be depicted for an idle state of the needle 304. As an example, the idle state of the needle 304 for the engine RPM may be indicative of an inactive state of the vehicle 104 and an idle state of the engine of the vehicle 104. The control circuitry 202 may determine the idle state of the needle 304 based on the received sensor data and may control the display device 106 to display the needle 304 on the initial scale marking 314 of the scale 302 based on the determination of the idle state.

At $t_1$, $t_2$, and $t_3$, the gauge graphic 300 may be depicted for different upward moving states of the needle 304. Herein, the received sensor data may indicate an increase in a value of the vehicle parameter in time. At $t_1$, based on the received sensor data, the control circuitry 202 may detect a movement of the needle 304 from a current position (e.g., the initial scale marking 314) to an upward position. The upward position may be below a first threshold marking 402 on the scale 302. In such a scenario, the control circuitry 202 may control the display device 106 to mask a first gradation pattern 404 in the second region 312 based on a determination that the needle 304 is below the first threshold marking 402 on the scale 302. Additionally, the control circuitry 202 may control the display device 106 to display a second gradation pattern 406 as a trailing pattern adjoining the needle 304. As shown, for example, the second gradation pattern 406 may be a white gradient overlaid over a black background of the scale 302. In some embodiments, the second gradation pattern 406 may have a fixed trail length and a trail that follows the movement of the needle 304. In other embodiments, the second gradation pattern 406 may have a variable trail length based on the received sensor data associated with one or more vehicle parameters (e.g., engine RPM and throttle) and a trail that follows the movement of the needle 304.

In at least one embodiment, the control circuitry 202 may apply a mask layer (e.g., a grey mask) over a background color of the scale 302. As the needle 304 moves upwards, the control circuitry 202 may unmask the background color in an active area below the needle 304, while an inactive area above the needle 304 retains the color of the mask layer. Also, with an upward movement of the needle 304, the active area may increase while the inactive area may decrease. The active area may also include the second gradation pattern 406 as a trailing pattern adjoining the needle 304.

At $t_2$, the received sensor data may indicate that the value of the vehicle parameter has increased beyond a threshold value for the vehicle parameter. The threshold value may be represented by the first threshold marking 402, which is in the first region 310 of the scale 302. Herein, an embodiment of the selection of the first threshold marking 402 is provided. Before unmasking the first gradation pattern 404, the control circuitry 202 may detect a current driving mode of the vehicle 104. The detected current driving mode may be one of: a turbo mode and a non-turbo mode. The control circuitry 202 may determine a threshold value of the vehicle parameter based on the detected current driving mode and select the first threshold marking 402 from the plurality of scale markings 306 along the length of the scale 302, based on the determined threshold value. An example of threshold values for the turbo mode and the non-turbo mode is provided in FIG. 5A and FIG. 5B.

Based on the received sensor data, the control circuitry 202 may detect a first movement of the needle 304 beyond the first threshold marking 402 on the scale 302 and towards an end of the first region 310. In such a scenario, the control circuitry 202 may control the display device 106 to gradually unmask the first gradation pattern 404 in the second region 312 based on the detected first movement of the needle 304. By way of example, the control circuitry 202 may change a transparency level of the masked first gradation pattern 404 to gradually unmask the masked first gradation pattern 404 in the second region 312 of the scale 302. As shown, for example, the first gradation pattern 404 may be a linear color gradient (e.g., a red color gradient) overlaid over a black background of the second region 312. As the needle 304 moves upwards beyond the first threshold marking 402, the strength of the linear color gradient increases as the transparency level of the first gradation pattern 404 increases. Additionally, or alternatively, while gradually unmasking the first gradation pattern 404, the control circuitry 202 may control the display device 106 to display the second gradation pattern 406 as a trailing pattern adjoining the needle 304 based on the detected first movement of the needle 304.

At time $t_3$, the received sensor data may indicate that the value of the vehicle parameter has crossed into a range of values for the second region 312 of the scale 302. Based on the received sensor data, the control circuitry 202 may detect a second movement of the needle 304 over the second region 312. In such a scenario, the control circuitry 202 may control the display device 106 to gradually change the unmasked first gradation pattern 404 so that the unmasked first gradation pattern 404 flashes with a defined frequency in the second region 312. By way of example, the control circuitry 202 may control the display device 106 to progressively alternate the transparency level of the unmasked first gradation pattern 404 between a minimum transparency level (e.g., 0%) and a maximum transparency level (e.g., 100%), so that the unmasked first gradation pattern 404 flashes with the defined frequency. The defined frequency at which the unmasked first gradation pattern 404 flashes may be set to, for example, about 6 Hertz with a sinusoidal variation. Additionally, or alternatively, based on the detected second movement of the needle 304 over the second region 312, the control circuitry 202 may control the display device 106 to hide the second gradation pattern 406, which appeared (previously at $t_0$ and $t_1$) as the trailing pattern adjoining the needle 304.

At time $t_4$, the received sensor data may indicate that the value of the vehicle parameter may have decreased from past values of the vehicle parameter. The control circuitry 202 detect a downward movement of the needle 304 on the scale 302 based on the received sensor data and may control the display device 106 to hide the second gradation pattern 406 that appeared as the trailing pattern adjoining the needle 304. If the needle 304 is in the second region 312, the display device 106 may be further controlled to hide the first gradation pattern 404.

It should be noted that the exemplary sequence 400 is merely provided as an example and should not be construed as limiting for the scope of the disclosure. The exemplary sequence 400 may vary from the one depicted in FIG. 4 based on real time variations in the sensor data, without limiting the scope of the disclosure.

An embodiment for a color variation of the plurality of scale values 308 on the scale 302 is described herein. At all the time instances $t_0$, $t_1$, $t_2$, $t_3$, and $t_4$, the control circuitry 202 may detect a current position of the needle 304 on the scale 302 and may select a first scale value to which the detected current position is nearest among the plurality of scale values 308. The control circuitry 202 may control the display device 106 to gradually change the first color (e.g., a grey color) of the selected first scale value to a second color (e.g., a white color). Thereafter, wherever the needle 304 moves on the scale 302, the color of a respective scale value changes to visually assist the driver to read the value of the vehicle parameter.

Figure 5A:
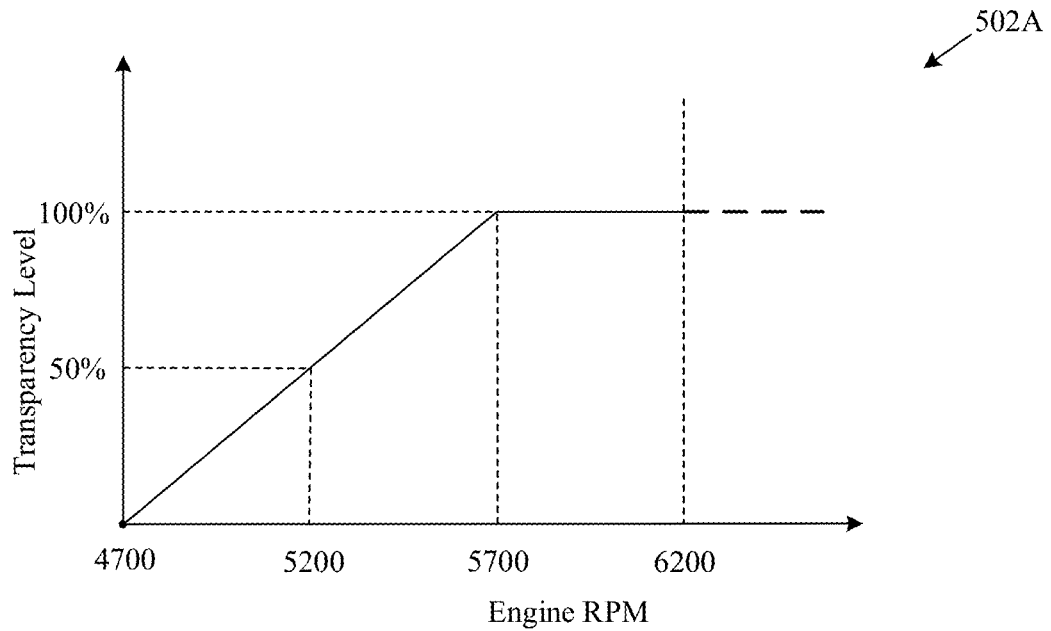
FIG. 5A is an exemplary graph between a transparency level for a gradation pattern and a vehicle parameter, in accordance with an embodiment of the disclosure.

FIG. 5A is an exemplary graph between a transparency level for a gradation pattern and a vehicle parameter, in accordance with an embodiment of the disclosure. FIG. 5A is explained in conjunction with elements from FIGS. 1, 2, 3, and 4. With reference to FIG. 5A, there is shown a graph 502A. The graph 502A may indicate a relationship between different values of a vehicle parameter (e.g., the engine RPM) and a transparency level of the first gradation pattern 404 in the second region 312. These different values depicted in the graph 502A may be pre-determined for a turbo mode of the vehicle 104 and may include a threshold value at which the transparency level of the first gradation pattern 404 begins to increase from an initial transparency level of 0%. The threshold value may correspond to the first threshold marking 402 on the scale 302.

As shown in the graph 502A, the transparency level of the first gradation pattern 404 may linearly increase from 0% to 50% as the engine RPM (as the vehicle parameter) increases from 4700 RPM to 5200 RPM. Herein, 4700 RPM may be referred to as the threshold value above which the first gradation pattern 404 is gradually unmasked in the second region 312 of the scale 302. Similarly, the transparency level may further increase linearly from 50% to 100% as the engine RPM increases from 5200 RPM to 5700 RPM. At this point, the first gradation pattern 404 is displayed in the second region 312 of the scale 302 with a maximum transparency level of 100%. Further increase in the engine RPM from 5700 RPM to 6200 RPM may result in no change in the maximum transparency level. Once the engine RPM crosses 6200 RPM, i.e. the needle 304 crosses into the second region 312 of the scale 302, the transparency level of the first gradation pattern 404 may be sinusoidally varied between 0% and 100% transparency levels so that it appears as if the first gradation pattern 404 flashes at a defined frequency (e.g., 6 Hertz) in the second region 312.

Figure 5B:
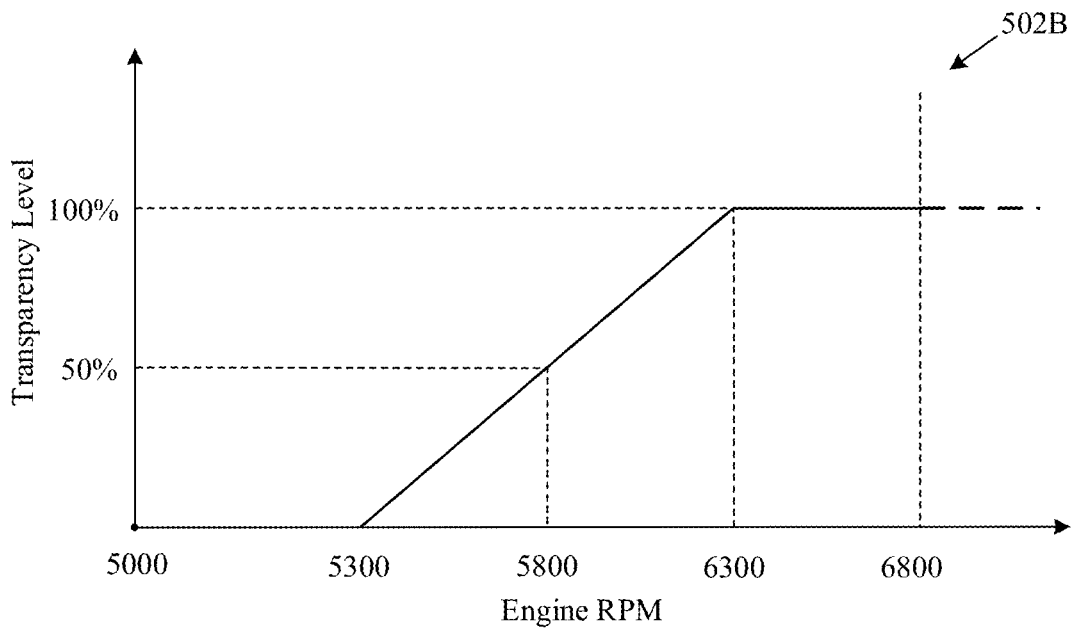
FIG. 5B is an exemplary graph between a transparency level for a gradation pattern and a vehicle parameter, in accordance with another embodiment of the disclosure.

FIG. 5B is an exemplary graph between a transparency level of a gradation pattern and a vehicle parameter, in accordance with another embodiment of the disclosure. FIG. 5B is explained in conjunction with elements from FIGS. 1, 2, 3, 4, and 5A. With reference to FIG. 5B, there is shown a graph 502B. The graph 502B may indicate a relationship between different values of the vehicle parameter (e.g., the engine RPM) and the transparency level of the first gradation pattern 404 in the second region 312. These different values depicted in the graph 502B may be pre-determined for a non-turbo mode of the vehicle 104 and may include a threshold value at which the transparency level of the first gradation pattern 404 begins to increase from an initial transparency level of 0%. The threshold value may correspond to the first threshold marking 402 on the scale 302.

As shown in the graph 502B, the transparency level of the first gradation pattern 404 may linearly increase from 0% to 50% as the engine RPM (as the vehicle parameter) increases from 5300 RPM to 5800 RPM. As shown in the graph 502A, the threshold value for the turbo mode is 4700 RPM, whereas the threshold value for the non-turbo mode is 5300 RPM, i.e. a difference of 600 RPM.

The transparency level may further increase from 50% to 100% as the engine RPM increases from 5800 RPM to 6300 RPM. At this point, the first gradation pattern 404 may be displayed in the second region 312 of the scale 302 with a maximum transparency level. Further increase in the engine RPM from 6300 RPM to 6800 RPM may result in no change in the maximum transparency level. Once the engine RPM crosses 6800 RPM, i.e. the needle 304 crosses into the second region 312 of the scale 302, the transparency level of the first gradation pattern 404 may be sinusoidally varied between 0% and 100% transparency levels so that it appears as if the first gradation pattern 404 flashes at a defined frequency (e.g., 6 Hertz) in the second region 312.

Figure 6:
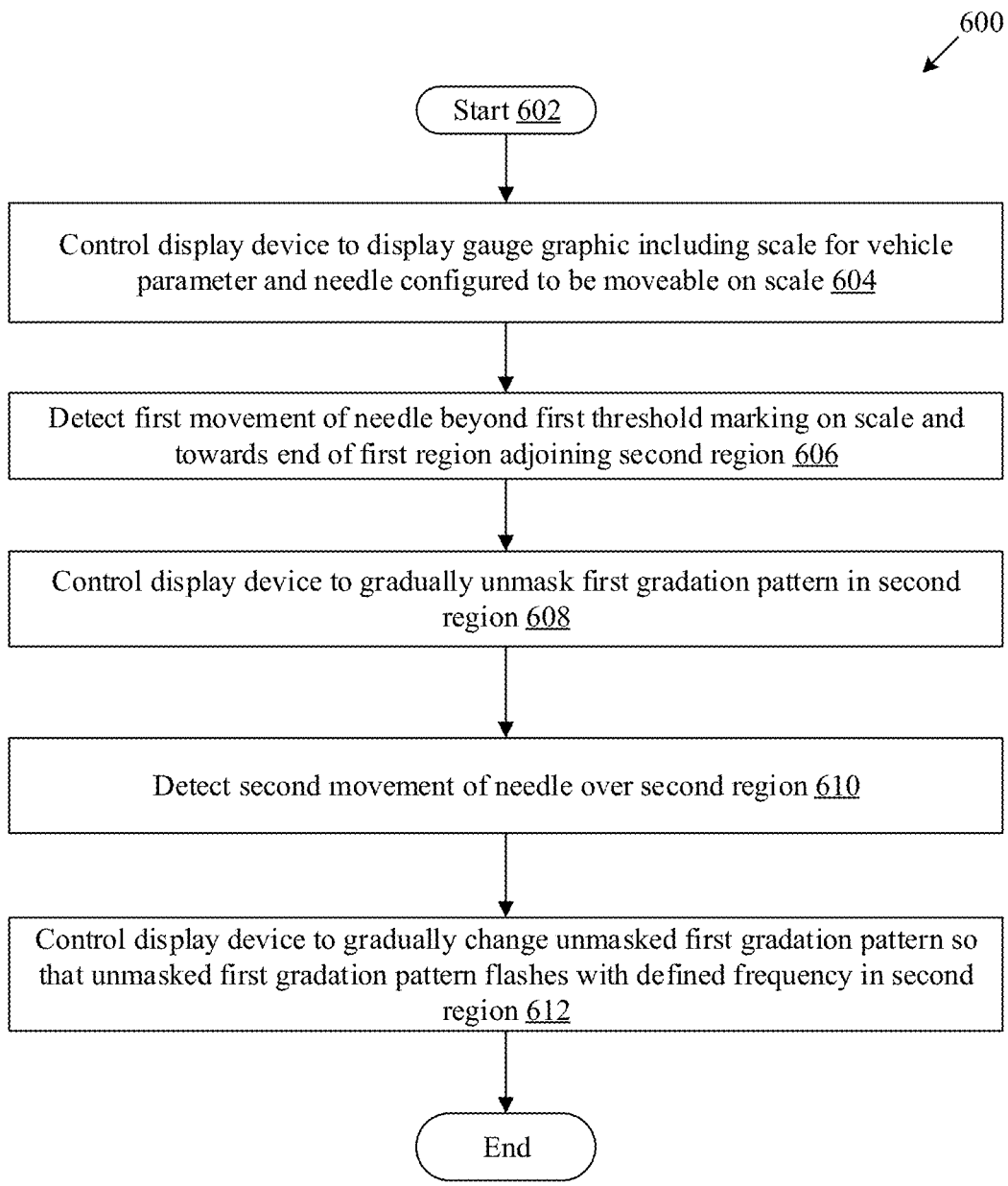
FIG. 6 is a flowchart that illustrates exemplary operations for display control of a gauge graphic, in accordance with an embodiment of the disclosure.

FIG. 6 is a flowchart that illustrates exemplary operations for display control of a gauge graphic, in accordance with an embodiment of the disclosure. With reference to 6, there is shown a flowchart 600. The flowchart 600 is described in conjunction with FIGS. 1, 2, 3, 4, 5A, and 5B. The operations from 602 to 612 may be implemented, for example, by the display system 102 of FIG. 2. The operations of the flowchart 600 may start at 602 and proceed to 604.

At 604, the display device 106 may be controlled to display the gauge graphic 108. The gauge graphic 108 may include the scale 110 for a vehicle parameter and the needle 112. The needle 112 may be configured to be movable on the scale 110. The scale 110 may include the first region 114 and the second region 116 that extends form the first region 114. In accordance with an embodiment, the display system 102 may be configured to control the display device 106 to display the gauge graphic 108 including the scale 110 and the needle 112 configured to be movable on the scale 110.

At 606, a first movement of the needle 112 may be detected beyond a first threshold marking 120 on the scale 110 and towards an end of the first region 114 adjoining the second region 116. In accordance with an embodiment, the display system 102 may be configured to detect the first movement of the needle 112 beyond the first threshold marking 120 on the scale 110 and towards the end of the first region 114 adjoining the second region 116.

At 608, the display device 106 may be controlled to gradually unmask a first gradation pattern in the second region 116 based on the detected first movement of the needle 112. In accordance with an embodiment, the display system 102 may be configured to control the display device 106 to gradually unmask the first gradation pattern in the second region 116 based on the detected first movement of the needle 112.

At 610, a second movement of the needle 112 may be detected over the second region 116. In accordance with an embodiment, the display system 102 may be configured to detect the second movement of the needle 112 over the second region 116.

At 612, the display device 106 may be controlled to gradually change the unmasked first gradation pattern so that the unmasked first gradation pattern flashes with a defined frequency in the second region 116 based on the detected second movement. In accordance with an embodiment, the display system 102 may be configured to control the display device 106 to gradually change the unmasked first gradation pattern so that the unmasked first gradation pattern flashes with the defined frequency in the second region 116 based on the detected second movement of the needle 112. Control may further pass to end.

Various embodiments of the disclosure may provide a non-transitory, computer-readable medium and/or storage medium, and/or a non-transitory machine readable medium and/or storage medium stored thereon, a set of instructions executable by a machine and/or a computer for display control of a gauge graphic. The set of instructions may be executable by the machine and/or the computer to perform operations that may include controlling a display device to display a gauge graphic including a scale and a needle configured to be movable on the scale. The scale may include a first region and a second region that extends from the first region. The operations may further include detecting a first movement of the needle beyond a first threshold marking on the scale and towards an end of the first region adjoining the second region. The operations may further include controlling the display device to gradually unmask a first gradation pattern of the second region based on the detected first movement. The operations may further include detecting a second movement of the needle over the second region and controlling the display device to gradually change the unmasked first gradation pattern so that the unmasked first gradation pattern flashes with a defined frequency in the second region, based on the detected second movement.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A display system for a vehicle, the display system comprising:
   a display device; and
   control circuitry communicatively coupled to the display device, wherein the control circuitry is configured to:
     control the display device to display a gauge graphic comprising a scale for a vehicle parameter and a needle configured to be movable on the scale, wherein the scale comprises a first region and a second region that extends from the first region;
     detect a first movement of the needle beyond a first threshold marking on the scale and towards an end of the first region adjoining the second region;
     control the display device to gradually unmask a first gradation pattern in the second region based on the detected first movement;
     detect a second movement of the needle over the second region;
   and based on the detected second movement, control the display device to change the unmasked first gradation pattern so that the unmasked first gradation pattern flashes with a defined frequency in the second region.

2. The display system according to claim 1, wherein the display device is one of a Multi-Information Display (MID), an automotive Head-Up Display (HUD), or an instrument cluster, and wherein the gauge graphic depicts one of a tachometer for an engine rotations-per-minute (RPM) or a speed gauge for a vehicle speed.

3. The display system according to claim 1, wherein the scale is a vertical scale comprising a plurality of scale markings along a length of the vertical scale, and
   wherein a color of the plurality of scale markings is different from a background color of the vertical scale.

4. The display system according to claim 1, wherein the control circuitry is further configured to:
   detect a current driving mode of the vehicle as one of: a turbo mode and a non-turbo mode;
   determine a threshold value of the vehicle parameter based on the detected current driving mode; and
   select the first threshold marking from a plurality of scale markings along a length of the scale, based on the determined threshold value.

5. The display system according to claim 1, wherein the control circuitry is further configured to:
   receive sensor data associated with the vehicle parameter; and
   determine an idle state of the needle based on the received sensor data; and
   control the display device to display the needle on an initial marking on the scale based on the determination of the idle state.

6. The display system according to claim 1, wherein the control circuitry is further configured to:
receive sensor data associated with the vehicle parameter;
detect a third movement of the needle from a current position to an upward position on the scale before the first threshold marking, based on the received sensor data; and
based on the detected third movement, control the display device to display a second gradation pattern as a trailing pattern adjoining the needle.

7. The display system according to claim 1, wherein the control circuitry is further configured to:
receive sensor data associated with the vehicle parameter;
detect the first movement of the needle beyond the first threshold marking on the scale and towards the end of the first region, based on the received sensor data; and
control the display device to display a second gradation pattern as a trailing pattern adjoining the needle, based on the detected first movement.

8. The display system according to claim 1, wherein the control circuitry is further configured to:
receive sensor data associated with the vehicle parameter;
detect the second movement of the needle over the second region based on the received sensor data; and
control the display device to hide a second graduation pattern which appeared as a trailing pattern adjoining the needle.

9. The display system according to claim 1, wherein the control circuitry is further configured to:
receive sensor data associated with the vehicle parameter;
detect a downward movement of the needle on the scale based on the received sensor data; and
control the display device to hide a second gradation pattern which appeared as a trailing pattern adjoining the needle.

10. The display system according to claim 1, wherein the control circuitry is further configured to:
receive sensor data associated with the vehicle parameter; and
based on the received sensor data, control the display device to:
mask the first gradation pattern based on a determination that the needle is below the first threshold marking on the scale; and
change a transparency level of the masked first gradation pattern so as to gradually unmask the masked first gradation pattern based on the detection of the first movement of the needle beyond the first threshold marking on the scale and towards the end of the first region.

11. The display system according to claim 1, wherein the control circuitry is further configured to:
receive sensor data associated with the vehicle parameter;
detect the second movement of the needle over the second region based on the received sensor data; and
based on the detected second movement, control the display device to progressively alternate a transparency level of the unmasked first gradation pattern between a minimum transparency level and a maximum transparency level, so that the unmasked first gradation pattern flashes with a defined frequency.

12. The display system according to claim 1, wherein the control circuitry is further configured to display, along a length of the scale, a plurality of scale values corresponding to a range of values of the vehicle parameter, wherein each scale value of the plurality of scale values is displayed by default by a first color.

13. The display system according to claim 12, wherein the control circuitry is further configured to:
detect a current position of the needle on the scale;
select, from the displayed plurality of scale values, a first scale value to which the detected current position is nearest among the plurality of scale values; and
control the display device to gradually change the first color of the selected first scale value to a second color.

14. A method, comprising:
in a display system that comprises a display device:
controlling the display device to display a gauge graphic comprising a scale for a vehicle parameter and a needle configured to be movable on the scale, wherein the scale comprises a first region and a second region that extends from the first region,
detecting a first movement of the needle beyond a first threshold marking on the scale and towards an end of the first region adjoining the second region;
controlling the display device to gradually unmask a first gradation pattern of the second region based on the detected first movement;
detecting a second movement of the needle over the second region;
and based on the detected second movement, controlling the display device to change the unmasked first gradation pattern so that the unmasked first gradation pattern flashes with a defined frequency in the second region.

15. The method according to claim 14, further comprising:
detecting a current driving mode of a vehicle as one of: a turbo mode and a non-turbo mode;
determining a threshold value of a vehicle parameter based on the detected current driving mode; and
selecting the first threshold marking from a plurality of scale markings along a length of the scale, based on the determined threshold value.

16. The method according to claim 14, further comprising:
receiving sensor data associated with a vehicle parameter; and
based on the received sensor data, controlling the display device to:
mask the first gradation pattern based on a determination that the needle is below the first threshold marking on the scale; and
change a transparency level of the masked first gradation pattern so as to gradually unmask the masked first gradation pattern based on the detection of the first movement of the needle beyond the first threshold marking on the scale and towards the end of the first region.

17. The method according to claim 14, further comprising:
receiving sensor data associated with a vehicle parameter;
detecting the second movement of the needle over the second region, based on the received sensor data; and
based on the detected second movement, controlling the display device to progressively alternate a transparency level of the unmasked first gradation pattern between a minimum transparency level and a maximum transparency level, so that the unmasked first gradation pattern flashes with a defined frequency.

18. A non-transitory computer-readable medium having stored thereon computer implemented instructions that, when executed by a display system, causes the display system to execute operations, the operations comprising:

controlling a display device to display a gauge graphic comprising a scale for a vehicle parameter and a needle configured to be movable on the scale, wherein the scale comprises a first region and a second region that extends from the first region, detecting a first movement of the needle beyond a first threshold marking on the scale and towards an end of the first region adjoining the second region;

controlling the display device to gradually unmask a first gradation pattern of the second region based on the detected first movement;

detecting a second movement of the needle over the second region; and based on the detected second movement, controlling the display device to change the unmasked first gradation pattern so that the unmasked first gradation pattern flashes with a defined frequency in the second region.

* * * * *